(12) United States Patent
Bechtold et al.

(10) Patent No.: US 9,099,714 B2
(45) Date of Patent: Aug. 4, 2015

(54) ELECTRICAL STORAGE BATTERY HAVING SPRING DAMPING ELEMENT

(75) Inventors: Dieter Bechtold, Gad Vilbel (DE); Kai Pelz, Springe (DE); Ralf Joswig, Buchholz (DE); Martin Wiegmann, Borstel (DE)

(73) Assignee: Johnson Controls Hybrid and Recycling GmbH, Hannover (DE)

( * ) Notice: Subject to any disclaimer, the term of this patent is extended or adjusted under 35 U.S.C. 154(b) by 947 days.

(21) Appl. No.: 11/848,985

(22) Filed: Aug. 31, 2007

(65) Prior Publication Data

US 2008/0063934 A1 Mar. 13, 2008

(30) Foreign Application Priority Data

Sep. 1, 2006 (DE) .......................... 10 2006 041 326

(51) Int. Cl.
*H01M 6/42* (2006.01)
*H01M 2/10* (2006.01)

(52) U.S. Cl.
CPC .......... *H01M 2/1094* (2013.01); *H01M 2/1061* (2013.01); *H01M 2/1077* (2013.01); *H01M 2/1083* (2013.01)

(58) Field of Classification Search
CPC ............ H01M 2/1061; H01M 2/1077; H01M 2/1083; H01M 2/1094
USPC .................................................. 429/149–153
See application file for complete search history.

(56) References Cited

U.S. PATENT DOCUMENTS

| | | | | |
|---|---|---|---|---|
| 2,939,901 | A | | 6/1960 | Schultz |
| 3,988,170 | A | * | 10/1976 | Koch et al. .................... 429/163 |
| 5,346,786 | A | * | 9/1994 | Hodgetts ........................ 429/159 |
| 5,366,827 | A | * | 11/1994 | Belanger et al. ................ 429/99 |
| 5,558,949 | A | * | 9/1996 | Iwatsuki et al. ............. 180/68.5 |
| 6,479,180 | B1 | * | 11/2002 | Uozumi .......................... 429/34 |
| 6,571,898 | B2 | * | 6/2003 | Guyomard ................... 180/68.4 |
| 6,761,992 | B1 | * | 7/2004 | Marukawa et al. ............. 429/96 |
| 7,014,949 | B2 | | 3/2006 | Kanai et al. |
| 2005/0260488 | A1 | | 11/2005 | Zhou et al. |

FOREIGN PATENT DOCUMENTS

DE 930731 * 7/1955
DE 100 64 648 A1 7/2001

(Continued)

OTHER PUBLICATIONS

"Stabilize." The American Heritage® Dictionary of the English Language, Fourth Edition. Houghton Mifflin Company, 2004. Feb. 23, 2009. <Dictionary.com http://dictionary.reference.com/browse/stabilize>.*

(Continued)

*Primary Examiner* — Edu E Enin-Okut
(74) *Attorney, Agent, or Firm* — Fletcher Yoder, P.C.

(57) ABSTRACT

An electrical storage battery includes a housing and a plurality of rectangular cell assembly modules electrically coupled together. The rectangular cell assembly modules are mounted by spring damping elements in the housing and are in each case arranged in an intermediate space between an outer area of at least one lower edge of the cell assembly modules and the housing, with at least one common spring damping element extending transversely with respect to the direction of the longest side of the cell assembly modules along the plurality of cell assembly modules.

17 Claims, 7 Drawing Sheets

(56) References Cited

FOREIGN PATENT DOCUMENTS

| | | | | |
|---|---|---|---|---|
| EP | 0 083 330 B1 | 10/1987 | | |
| EP | 1 901 366 B1 | 11/2011 | | |
| JP | 02197446 A * | 8/1990 | ............. | H01M 2/10 |
| JP | 09106832 A * | 4/1997 | ............. | H01M 10/39 |
| JP | 2001-268717 | 9/2001 | | |
| JP | 2001268717 A * | 9/2001 | ............. | H01M 2/10 |
| JP | 2001313018 A * | 11/2001 | ............. | H01M 2/10 |
| JP | 2003257391 | 9/2003 | | |
| WO | WO 2006/087962 | 8/2006 | | |
| WO | WO 2006090904 A1 * | 8/2006 | ............. | H01M 2/02 |

OTHER PUBLICATIONS

"Rectangular." Merriam-Webster. Merriam-Webster, n.d. Web. Jun. 20, 2012. <http://www.merriam-webster.com/dictionary/rectangular>.*

* cited by examiner

ELECTRICAL STORAGE BATTERY HAVING SPRING DAMPING ELEMENT

BACKGROUND

The present invention relates generally to the field of electrical storage batteries, and more particularly, to such batteries having a housing and a plurality of rectangular cell assembly modules which are electrically connected to one another.

Electrical storage batteries are sufficiently well known, in particular for use in vehicles. Starter batteries are generally in the form of lead-acid rechargeable batteries, in which a multiplicity of electrolyte plates are held in a plastic housing which is filled with electrolyte.

Furthermore, the use of electrical storage batteries as traction batteries in vehicles is also known. Nickel metal hydride, nickel cadmium, or lithium cells are used, in particular, for this purpose.

In these storage batteries, round cells have electrode plates which are wound and are located one on top of the other. The cuboid cells have a multiplicity of rectangular electrode plates which are stacked one on top of the other, separated from one another by separators. These round cells or cuboid cells can themselves once again be combined to form cell assembly modules.

An electrical storage battery which is suitable in particular for use as a traction battery for supplying a vehicle has a multiplicity of such cells or cell assembly modules, which are arranged in a common housing. The arrangement and installation of the cell assembly modules in the housing are in this case optimized in particular for the thermal behavior in the housing.

DE 100 64 648 A1 discloses an electrical storage battery having a housing and a plurality of round cells which are electrically connected to one another. A plurality of round cells are connected in series to form a cylindrical cell assembly module, with the aid of connecting pieces. The cell assembly modules are then held by means of circular openings in a mount in the form of a disk, so that they are arranged alongside one another along a radius, leaving a cavity free in the center for cooling. This resultant tubular arrangement of cell assembly modules has electrical contact made with it and is mechanically fixed by contact plates at both ends. The entire arrangement is firmly screwed in a housing.

AT 27 667 E discloses a lead-acid rechargeable battery in which the connector strips of electrodes are mounted, by means of a shock-absorbing element, on the base of the cell vessel. This reduces the sensitivity of lead-acid rechargeable batteries to shocks.

U.S. Pat. No. 7,014,949 B2 discloses a battery pack having a plurality of cylindrical lithium-ion rechargeable battery cells, which are held in a rectangular housing. Vibration-damping materials are applied to the eight corners, the narrow face edges or the upper and lower faces of the housing.

JP 2003 25 7391 A discloses a battery pack having a multiplicity of cells which are mounted in the battery pack by vibration-damping means, for example springs. For vehicle applications in particular, the individual cells and cell assembly modules of electrochemical storage batteries must withstand the environmental conditions throughout the life of the vehicle. In this case, inter alia, the storage batteries must be able to absorb the vibration, oscillations, shocks and impacts transmitted through the vehicle, without being damaged. At the same time, forces and geometric changes that occur, for example those which can occur as a result of the internal pressure in the cells or cell assembly modules or as a result of temperature-dependent geometric changes, must be tolerable, and it must be possible to cope with them reliably. In addition, it must be possible to cope with manufacturing tolerances, that is to say dimensional differences between the components, during assembly, so as to allow the individual components to be accommodated and secured reliably.

SUMMARY

An exemplary embodiment of the invention relates to an electrical storage battery that includes a housing and a plurality of rectangular cell assembly modules electrically coupled together. The rectangular cell assembly modules are mounted by spring damping elements in the housing and are in each case arranged in an intermediate space between an outer area of at least one lower edge of the cell assembly modules and the housing, with at least one common spring damping element extending transversely with respect to the direction of the longest side of the cell assembly modules along the plurality of cell assembly modules.

DETAILED DESCRIPTION

Figure 1:
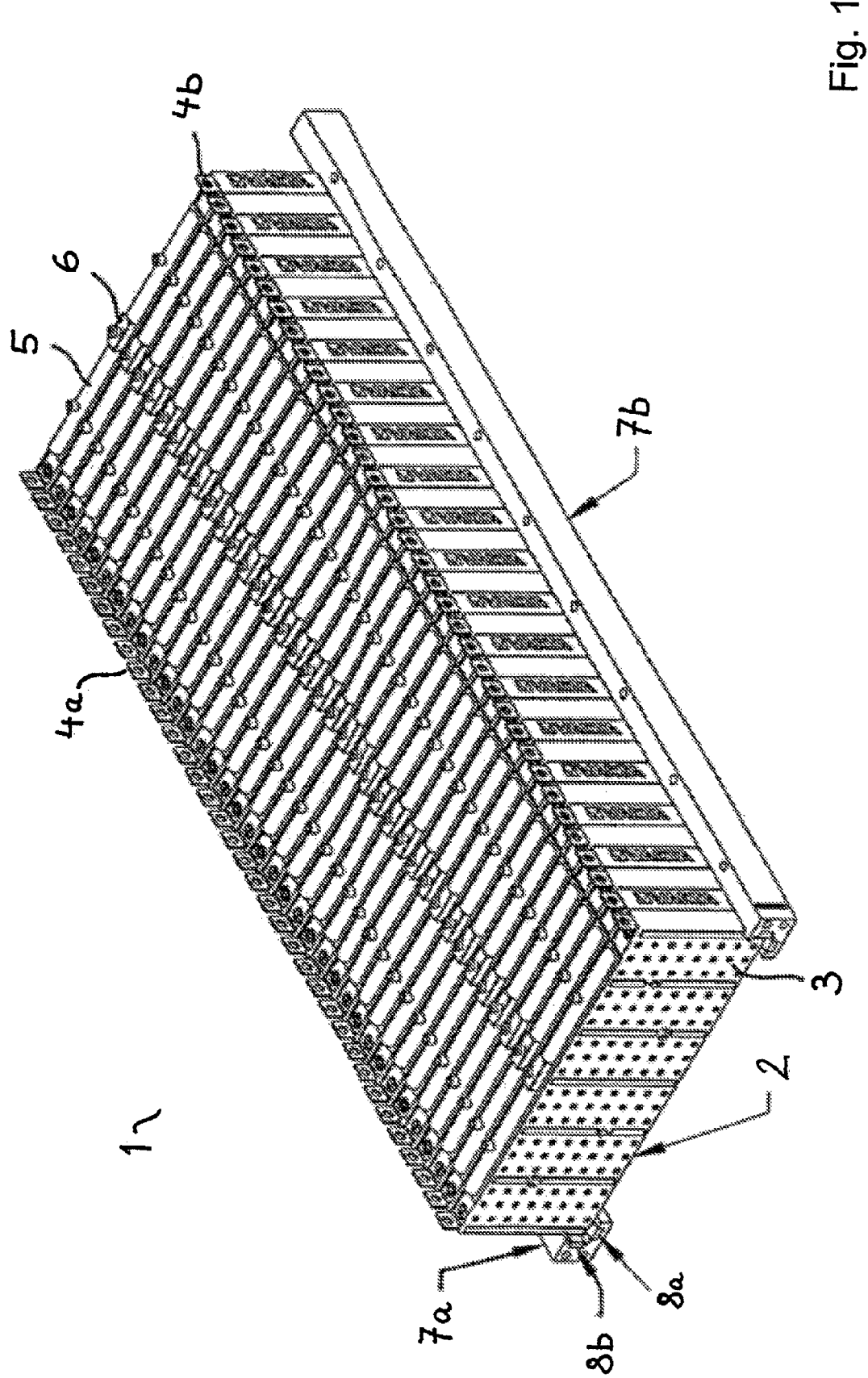
FIG. 1 shows a perspective view of an electrical storage battery having a multiplicity of cell assembly modules mounted in mounting rails.

According to an exemplary embodiment, an improved electrical storage battery is provided in which any desired number of cell assembly modules are mounted in a battery assembly such that the storage battery reliably withstands vibration, oscillations, shocks and bumps, etc. and such that manufacturing tolerances are compensated for.

Such an electrical storage battery is provided such that rectangular cell assembly modules are mounted by means of spring damping elements in the housing and are in each case arranged in the intermediate space between the outer area of at least one lower edge of the cell assembly modules and the housing, with at least one common spring damping element extending transversely with respect to the direction of the longest side of the cell assembly modules along the plurality of cell assembly modules.

The spring damping elements mean that vibration, oscillations, shocks, bumps, and the like introduced from the outside are damped and are therefore very largely absorbed. Furthermore, the spring damping elements compensate for discrepancies in dimensions as well as discrepancies in the shape and position of the components to be installed, by application of force by means of the spring damping elements. The spring damping element therefore provides a mounting for the cell assembly modules in the housing, based on the principle of a loose and fixed bearing.

This common spring damping element means that the cell assembly modules, which are arranged in a row, have a common bearing.

Two spring damping elements are preferably arranged in the outer area of the lower edges of the cell assembly elements, such that the cell assembly modules are mounted on the housing at their lower edge by means of the spring damping elements.

It is also advantageous for a spring damping element to be arranged on each of the two side edges of the cell assembly modules. This results in the cell assembly modules also being supported laterally in the housing by a loose/fixed bearing arrangement.

In one particularly advantageous embodiment, a mounting rail, which has an L-shaped profile, is in each case arranged adjacent to the transitions between the lower edge and the side edge of the cell assembly modules. The L-shaped mounting rail has two limbs, with the two limbs on associated side edges of the limbs being at right angles to one another. The mounting rails then extend transversely with respect to the direction of the longest side of the rectangular cell assembly modules along the plurality of cell assembly modules, so that the rectangular cell assembly modules, which are arranged in a row on one another, are each attached by one limb to the lower face and by the other limb to one side. The at least one mounting rail, which is provided as a loose bearing, may have grooves for holding a separate spring damping element, by a mounting rail being inserted into the groove. However, it is also feasible for the mounting rail, which acts as a loose bearing, to itself be composed of a sprung and damping material and itself to act as a spring damping element. It is also feasible for the mounting rail, which acts as a loose bearing, to be screwed to the housing via a spring pack.

In addition, the cell assembly modules can be connected to the housing via a fixed bearing or bearings. For this purpose, for example, the mounting rail may have a projection which engages in a groove in the cell assembly modules to be held by the mounting rail, in order to provide a fixed bearing by means of a tongue and groove connection.

Furthermore, an additional spring damping element can be provided on the outer side walls of a block of cell assembly modules, which are arranged in a row with one another, adjacent to the neighboring side wall of the housing, and adjacent to the corresponding side wall of the outer cell assembly modules on the side wall of the housing, in order to compensate for vibration, shocks, manufacturing tolerances, and the like.

According to an exemplary embodiment, the spring damping elements are formed from a highly elastic elastomer material. For example, such spring damping elements may be formed from a technical spring which, for example, is inserted in strips into the mounting rail such that it is possible to clamp the cell assembly modules in different axial directions.

FIG. 1 shows an electrical storage battery 1 having a multiplicity of rectangular cell assembly modules 2 which are arranged in a row or rows adjacent to one another on the side walls. The cell assembly modules 2 have a multiplicity of rectangular electrodes, which are stacked on one another, separated by separators, and are accommodated in the outer housing 3 of the cell assembly module. FIG. 1 also shows the positive and negative connecting poles 4a, 4b as well as the gas dissipation channels 5 with overpressure valves 6.

The cell assembly modules 2 are held on the lower side edges by means of a first and a second mounting rail 7a, 7b, based on the principle of a loose and fixed bearing. In this case, spring damping elements 8a, 8b in the form of strips are inserted into grooves in the mounting rails 7a, 7b, on which the cell assembly modules 2 are mounted.

The mounting rails 7a, 7b have an L-shaped profile and each have two limbs or legs which are at right angles to one another on associated side edges. The lower limbs of the mounting rails 7a, 7b are adjacent to the lower edge of the cell assembly modules 2, while the side limbs are adjacent to the side edges of the cell assembly modules 2.

Figure 11:
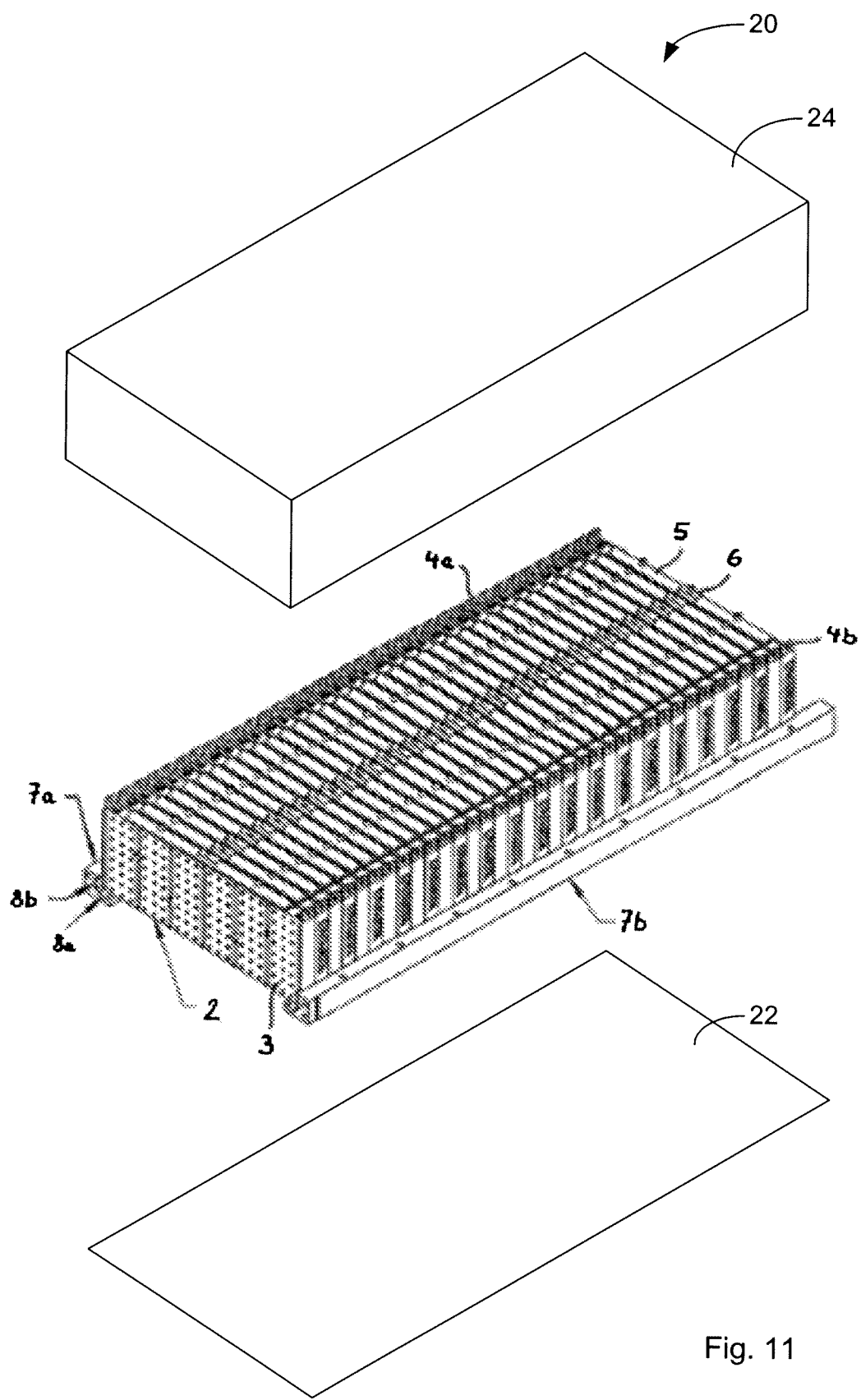
FIG. 11 shows a partially exploded perspective view of an electrical storage battery illustrating a housing used therewith according to an exemplary embodiment.

The mounting rails 7a, 7b are screwed tightly to a housing (shown generically in FIG. 11 as a housing 20 having a first portion or base 22 and a second portion or cover 24, although it should be understood that other configurations are possible according to other exemplary embodiments).

Figure 2:
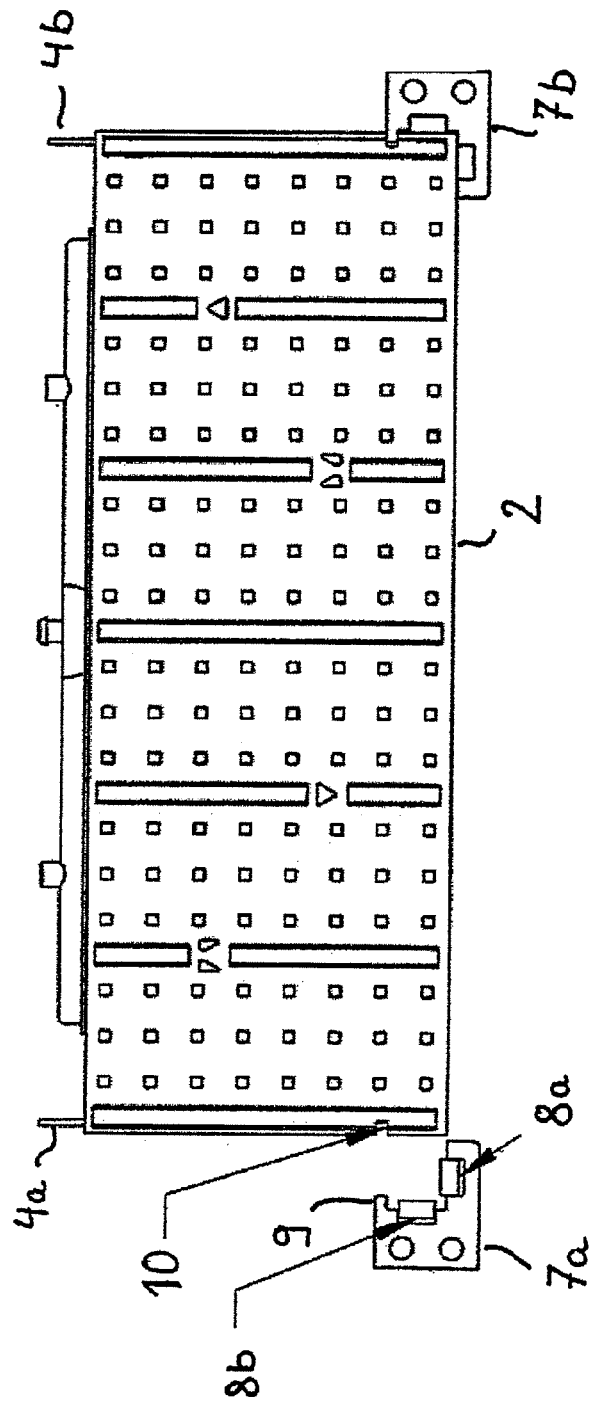
FIG. 2 shows a side view of a cell assembly module having grooves and mounting rails at the lower corners.

FIG. 2 shows a side view of a cell assembly module 2 and the left and right mounting rails 7a, 7b. The left mounting rail 7a is in this case illustrated in an exploded view, and the right mounting rail 7b is illustrated in the installed state. As can be seen, a spring 9 which projects from the side limb of the mounting rails in the direction of the cell assembly module 2 engages in a corresponding groove 10 incorporated in the narrow face of the housing of the cell assembly module 2. This provides a fixed bearing for the cell assembly module 2 on the mounting rail 7, which nevertheless allows a certain amount of freedom of movement in the longitudinal direction of the cell assembly module 2 (i.e., in the direction of the longest side of the cell assembly module 2).

As can also be seen, the limbs of the mounting rail 7a, 7b have grooves into which spring damping elements 8a, 8b, in the form of strips, are inserted. These spring damping elements 8a, 8b project from the surface of the limbs in order to support the cells 2. The spring damping element may, for example, be a technical spring which is formed from a highly elastic elastomer. The fact that the spring damping elements make contact in the form of strips in the mounting rails 7a, 7b allows the cell assembly modules 2 to be clamped in different axial directions. In principle, insertion in all axial directions is possible. Cell assembly modules 2 which wish to move over a certain distance as a result of vibration, oscillations, shocks, bumps or length changes resulting from temperature influences must apply a force to do so. The opposing force to be applied can be defined by means of the spring characteristic of the material used for the spring damping elements. The increase in force is proportional to the movement distance.

Figure 3:
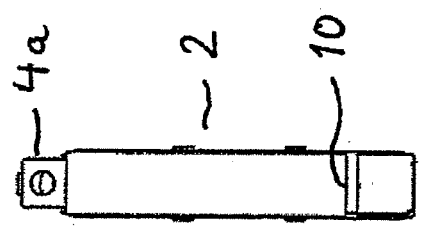
FIG. 3 shows a view of the narrow face of a cell assembly module with a transversely running groove.

FIG. 3 shows a view of the narrow face of a cell assembly module 2. This clearly shows the groove which extends transversely from one side wall to the other over the narrow face, and is intended to engage with the spring 9 on an associated mounting rail 7.

Figure 4:
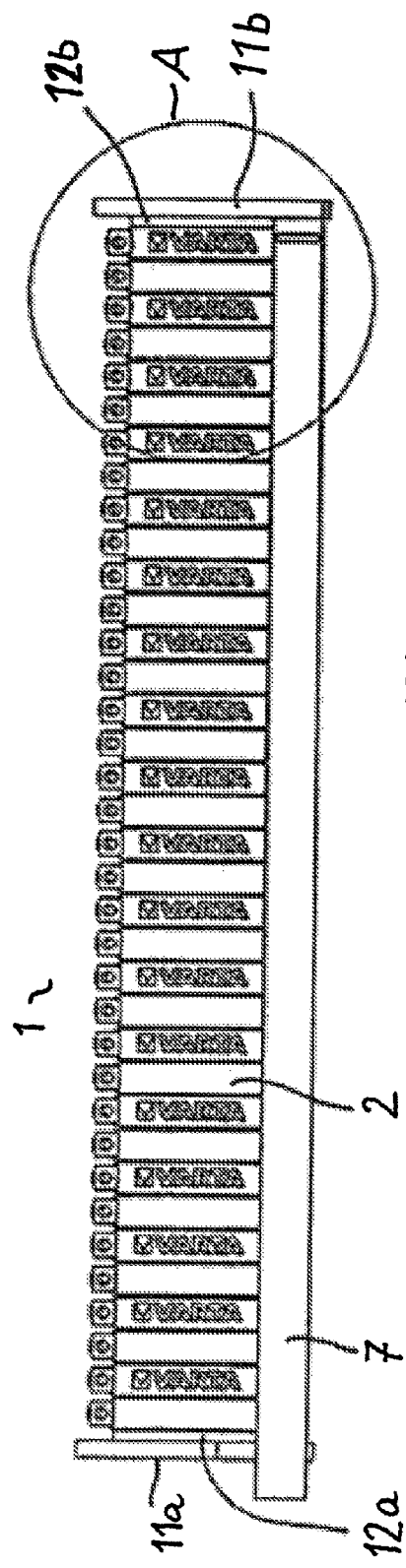
FIG. 4 shows a side view of the electrical storage battery shown in FIG. 1.

FIG. 4 shows a side view of the electrical storage battery 1 with a multiplicity of cell assembly modules 2 arranged in a row or rows. This clearly shows that a further spring damping element 12a, 12b is in each case adjacent to the left and right side walls 11a, 11b and, on the other side, is essentially connected to the entire surface of the side wall of the adjacent outer cell assembly modules 2. This means that vibration and shocks that are introduced into the group of cell assembly modules 2 from the side wall 11a, 11b are also absorbed.

Figure 5:
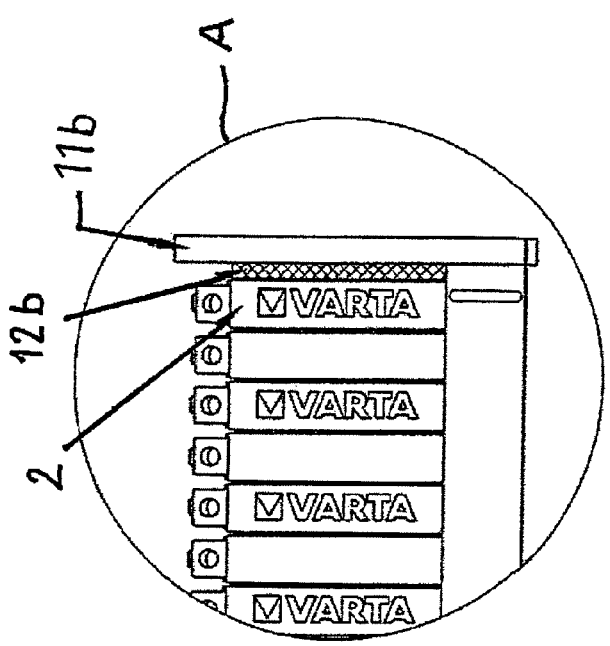
FIG. 5 shows a detail from the side view shown in FIG. 4, with a spring damping element between the side wall of the housing and the side wall of the outer cell assembly module.

FIG. 5 shows a detail a from the side view in FIG. 4. The detailed view shows, even more clearly, the spring damping element 12*b* inserted between the outer cell assembly modules 2 and the right-hand side wall 11*b*.

Figure 6:
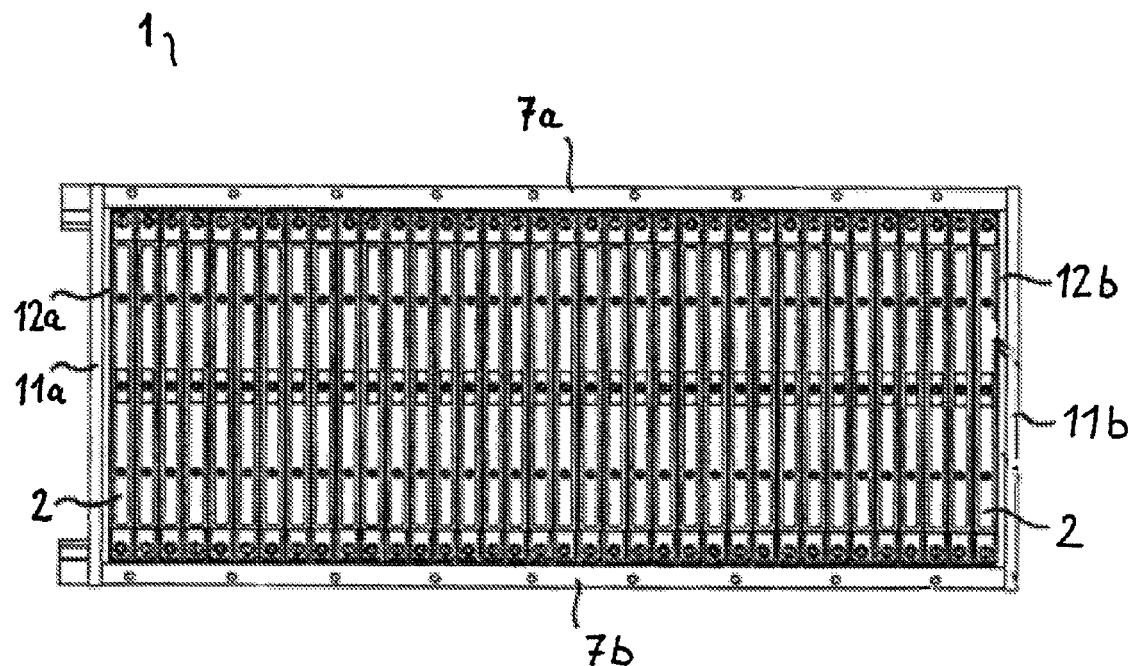
FIG. 6 shows a plan view of the electrical storage battery.

FIG. 6 shows a plan view of the electrical storage battery 1. Once again, this clearly shows that the mounting rails 7*a*, 7*b* are fitted on the lower face and support the sides with the rectangular cell assembly modules, which are arranged in a row or rows on one another. Furthermore, FIG. 6 shows the spring damping elements 12*a*, 12*b* between the side walls 11*a*, 11*b* of the housing and the outer cell assembly modules 2.

Figure 7:
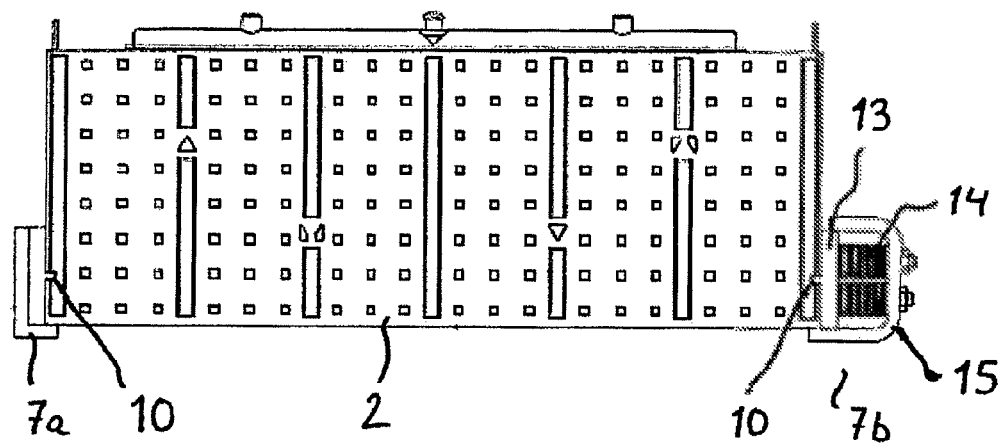
FIG. 7 shows a side view of a cell assembly module with a transversely running groove, and a further embodiment of mounting rails for loose and fixed bearing.

FIG. 7 shows a side view of a cell assembly module 2 with a transversely running groove 10, in conjunction with a further embodiment of mounting rails 7*a*, 7*b* for loose and fixed bearing of a group of cell assembly modules 2 arranged in a row or rows on one another. The mounting rail 7*a*, which is provided as a fixed bearing, has a projection which engages in the grooves 10 in the cell assembly modules 2. On the opposite side of the cell assembly modules 2, the mounting rail 7*b*, which is provided as the loose bearing, likewise has a rail 13 with a projection which engages in the grooves 10 of the cell assembly modules 2. The rail 13 is connected via a spring damping element 14 to a mounting rail 15 so as to allow the cell assembly modules 2 to expand in the longitudinal direction (i.e., in the direction from the fixed-bearing mounting rail 7*a* to the loose-bearing mounting rail 7*b*), and this expansion can be compensated for by the spring damping element 14.

Figure 8:
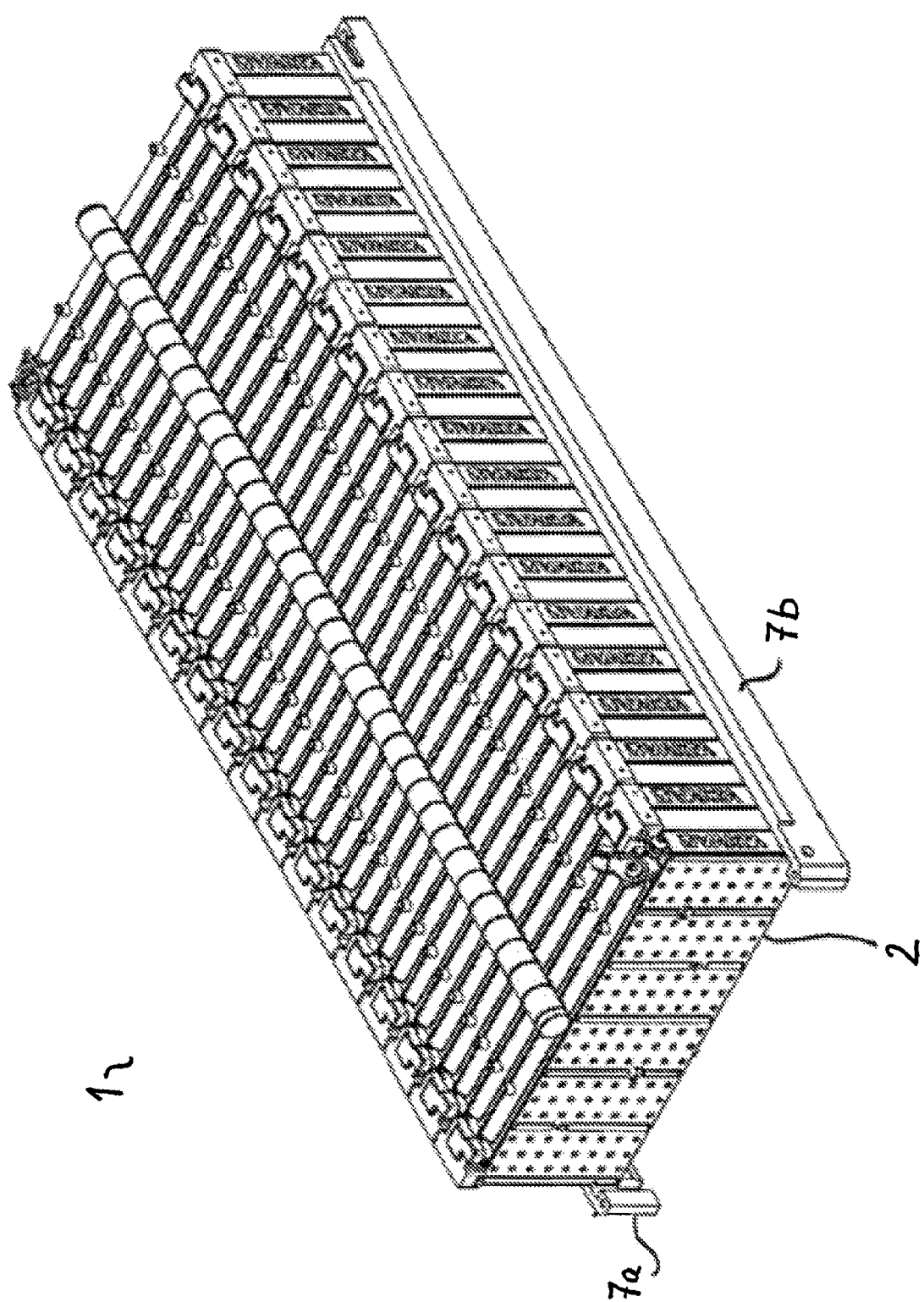
FIG. 8 shows a perspective view of an electrical storage battery having a multiplicity of cell assembly modules supported in mounting rails.

FIG. 8 shows a perspective view of an electrical storage battery 1 having a multiplicity of cell assembly modules 2 supported in the mounting rails 7*a*, 7*b*.

Figure 9:
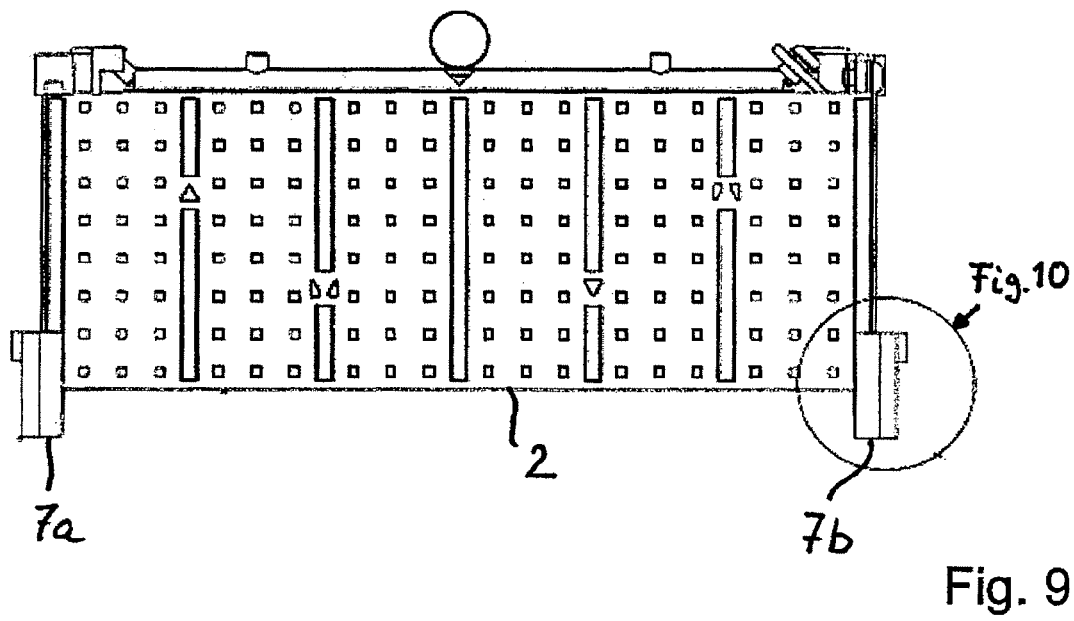
FIG. 9 shows a side view of a cell assembly module having a transversely running groove and a further embodiment of mounting rails for loose and fixed bearing.

FIG. 9 shows a side view of a cell assembly module 2 with a further embodiment of mounting rails 7*a*, 7*b* for loose and fixed bearing of the cell assembly module 2.

Figure 10:
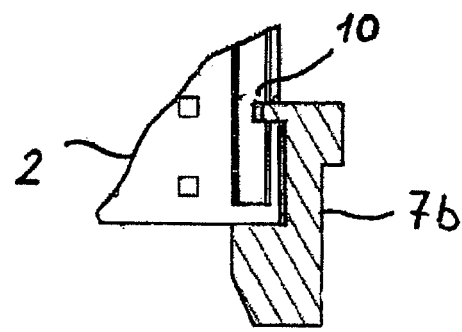
FIG. 10 shows a detail view of a cross section through the fixed-bearing mounting rail.

FIG. 10 shows a detail view of a cross section through the loose-bearing mounting rail 7*b*. This clearly shows that the loose-bearing mounting rail 7*b* has a projection (spring) which engages in the groove 10 in the cell assembly module 2, with a gap being provided between the cell assembly module 2 and the mounting rail 7*b* in order to allow expansion of the cell assembly module 2. The tongue and groove connection nevertheless ensures that the cell assembly modules 2 are supported firmly transversely with respect to the longitudinal direction, and are guided in the longitudinal direction.

The mounting rail 7*b*, which acts as a loose bearing, can optionally also be formed from a spring damping material according to other exemplary embodiments.

The present application claims priority to German Patent Application No. 10 2006 041 326.1 filed Sep. 1, 2006, the entire disclosure of which is incorporated herein by reference, including the specification, drawings, claims and abstract.

It is also important to note that the construction and arrangement of the electrical storage battery as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. An electrical storage battery comprising:
a housing;
a plurality of rectangular cell assembly modules electrically coupled together; and
at least one spring damping element coupled to a first mounting rail provided in a space between the housing and the plurality of rectangular cell assembly modules, the at least one spring damping element extending along all of the rectangular cell assembly modules of the electrical storage battery adjacent a transition between a lower edge and a side edge of each of the cell assembly modules, wherein the first mounting rail comprises a groove to hold the at least one spring damping element.

2. The electrical storage battery of claim 1, further comprising a second spring damping element coupled to the first mounting rail and extending along the rectangular cell assembly modules adjacent the lower edge of each of the cell assembly modules.

3. The electrical storage battery of claim 1, wherein at least one spring damping element is arranged on both side edges of each of the cell assembly modules.

4. An electrical storage battery comprising:
a housing;
a plurality of rectangular cell assembly modules electrically coupled together; and
at least one spring damping element coupled to a first mounting rail provided in a space between the housing and the plurality of rectangular cell assembly modules, the at least one spring damping element extending along all of the rectangular cell assembly modules of the electrical storage battery adjacent a transition between a lower edge and a side edge of each of the cell assembly modules, wherein the first mounting rail has an L-shaped profile defined by two limbs arranged at generally right angles to one another on associated side edges, the first mounting rail provided adjacent to a transition between lower edges and side edges of each of the cell assembly modules and comprising the at least one spring damping element coupled to a first of the two limbs and at least another spring damping element coupled to the second of the two limbs.

5. The electrical storage battery of claim 1, further comprising a second mounting rail provided in a space between the housing and the plurality of rectangular cell assembly modules opposite the first mounting rail, with at least one of the mounting rails being formed from a spring and damping material and acting as a spring damping element.

6. An electrical storage battery comprising:
a housing;
a plurality of rectangular cell assembly modules electrically coupled together; and
at least one spring damping element coupled to a first mounting rail provided in a space between the housing and the plurality of rectangular cell assembly modules, the at least one spring damping element extending along all of the rectangular cell assembly modules of the electrical storage battery adjacent a transition between a lower edge and a side edge of each of the cell assembly modules; and a second mounting rail provided in a space between the housing and the plurality of rectangular cell assembly modules opposite the first mounting rail wherein at least one of the mounting rails is screwed to the housing via a spring pack.

7. An electrical storage battery comprising:

a housing;

a plurality of rectangular cell assembly modules electrically coupled together;

at least one spring damping element coupled to a first mounting rail provided in a space between the housing and the plurality of rectangular cell assembly modules, the at least one spring damping element extending along all of the rectangular cell assembly modules of the electrical storage battery adjacent a transition between a lower edge and a side edge of each of the cell assembly modules; and a plurality of spring damping elements provided adjacent to side walls of the housing and side walls of at least one of the cell assembly modules.

8. The electrical storage battery of claim 7, wherein the spring damping elements are formed from an elastomeric material.

9. An electrical storage battery comprising:

a housing;

a plurality of rectangular cell assembly modules electrically coupled together;

at least one spring damping element coupled to a first mounting rail provided in a space between the housing and the plurality of rectangular cell assembly modules, the at least one spring damping element extending along all of the rectangular cell assembly modules of the electrical storage battery adjacent a transition between a lower edge and a side edge of each of the cell assembly modules, wherein the cell assembly modules are coupled to the housing with at least one fixed bearing and the at least one fixed bearing is provided in the form of a tongue and groove connection between the cell assembly module and the housing.

10. An electrical storage battery comprising:

a housing;

a plurality of rectangular cell assembly modules provided side-by-side; and at least one mounting rail having an L-shaped profile defined by two limbs arranged at generally right angles to one another on associated side edges, the mounting rail provided adjacent to a transition between a lower edge and a side edge of each of the cell assembly modules and extending parallel to the transition of the lower edge and the side edge of each of the cell assembly modules along the plurality of cell assembly modules;

wherein the at least one mounting rail comprises at least one spring damping element coupled to at least one of the two limbs of the mounting rail, the spring damping element extending along all of the plurality of cell assembly modules of the electrical storage battery adjacent the transition between the lower edge and the side edge of each of the cell assembly modules.

11. The electrical storage battery of claim 10, wherein at least one spring damping element is coupled to each of the two limbs of the mounting rail.

12. The electrical storage battery of claim 10, wherein at least one spring damping element is arranged on both side edges of each of the cell assembly modules.

13. The electrical storage battery of claim 10, wherein the at least one mounting rail comprises a groove to hold the at least one spring damping element.

14. The electrical storage battery of claim 10, wherein the at least one mounting rail is formed from a spring and damping material and acts as the at least one spring damping element.

15. The electrical storage battery of claim 10, wherein the at least one mounting rail is screwed to the housing via a spring pack.

16. The electrical storage battery claim 10, further comprising a plurality of spring damping elements provided adjacent to side walls of the housing and side walls of at least one of the cell assembly modules.

17. The electrical storage battery of claim 10, wherein the at least one spring damping element is formed from an elastomeric material.

* * * * *